United States Patent [19]

McCullough, Jr. et al.

[11] Patent Number: 5,015,522
[45] Date of Patent: May 14, 1991

[54] MULTICOMPONENT FIBERS, FILMS AND FOAMS

[75] Inventors: Francis P. McCullough, Jr., Lake Jackson; R. Vernon Snelgrove, Damon, both of Tex.; David M. Hall, Auburn, Ala.

[73] Assignee: The Dow Chemical Company, Midland, Mich.

[21] Appl. No.: 577,982

[22] Filed: Sep. 5, 1990

[51] Int. Cl.⁵ .......................... B32B 3/26; B32B 9/00
[52] U.S. Cl. .................................. 428/312.2; 428/367; 428/398; 428/408
[58] Field of Search ..................... 428/312.2, 367, 398, 428/408

[56] References Cited

U.S. PATENT DOCUMENTS

| | | |
|---|---|---|
| 3,330,896 | 7/1967 | Fujita et al. . |
| 3,861,992 | 1/1975 | Guthrie . |
| 4,060,968 | 12/1977 | Barbe et al. . |
| 4,897,303 | 1/1990 | McCullough, Jr. ................ 428/408 |
| 4,959,261 | 9/1990 | McCullough, Jr. ................ 428/408 |

Primary Examiner—William J. Van Balen

[57] ABSTRACT

A multicomponent polymeric fiber, film or foam having at least one component comprising fire resistant carbonaceous material and another component comprising non-carbonaceous material.

17 Claims, 1 Drawing Sheet

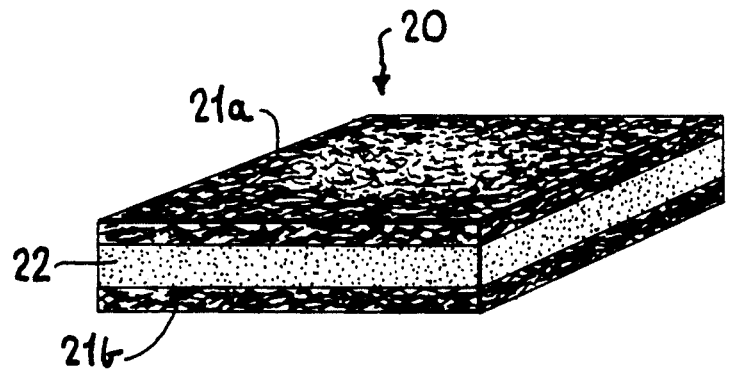

MULTICOMPONENT FIBERS, FILMS AND FOAMS

FIELD OF THE INVENTION

The present invention relates to fire resistant multicomponent polymeric fibers, films and foams. More particularly, the present invention is concerned with multicomponent fibers, films and foams having one component comprising fire resistant non-graphitic carbonaceous material and another component comprising a non-carbonaceous polymeric material having the desired properties of flexibility, tenacity, and workability for forming fabrics or other structures.

BACKGROUND OF THE INVENTION

It is known to provide yarns or fabrics with multicomponent fibers of two dissimilar acrylonitrile polymeric components eccentrically disposed toward each other in distinct zones extending throughout the length of the fiber with adjoining surfaces in intimate adhering contact. Such fibers are disclosed in U.S. Pat. No. 3,330,896, to Fujita et al. The components in these fibers have different thermal shrinkages and result upon heat treatment in fibers having a three dimensional crimp.

It is further known to provide bicomponent foams wherein two different foams with differing physical characteristics are integrally joined in a mold during formation. Such bicomponent foams generally do not have any fire resistant characteristics and are used for their resiliency and compressibility.

To provide the prior art multicomponent polymeric materials with fire resistance would normally require the addition of a further component or additive which prevents ignition.

Current methods for providing fire resistance to polymeric materials require blending with a fire resistant organic material as a major component in a mixture. Fiber blends with high performance fibers such as, for example, KEVLAR (a trademark of E. I. du Pont de Nemours & Co. for p-aramid) with a limited oxygen index (LOI) of 29 according to test method ASTM D2863-77, polybenzimidazole (LOI 40), PANOX (a trademark of R. K. Textiles Composite Fibers, Ltd. for oxidized polyacrylonitrile) (LOI 55) are commonly utilized. Examples of these include fire resistant blends of KEVLAR-cotton or KEVLAR-polyester wherein the KEVLAR must be present at levels well above 60 weight percent.

Other methods include adding various chemical additives or coatings such as phosphorous or halogen containing compounds. However, the fire resistant performance is minimal, undependable and subject to neutralization.

Various methods are known to reduce the flammability of polymeric foams. Commonly, additives such as aluminum trihydrate or phosphorus-containing compounds are incorporated into the foam as a flame retardant. Alternatively, halogenated polyols, bromine containing compounds or modacrylics are used in connection with polyurethanes to increase the flame resistance of the foam. None of these additives have proved entirely satisfactory.

It is known that the incorporation of trimerized polyisocyanates (i.e. isocyanaurates) into a polyurethane foam improves its burn characteristics. For example, trimerized toluenediisocyanate has been used to prepare flexible foams. Although these foams do exhibit good foam forming characteristics, they also have poor physical properties, particularly, poor compression sets and partial cell collapse.

With particular reference to the physical and mechanical properties of foams, they are extremely useful for a wide variety of application, including insulation, upholstery and bedding. However, many foams, for example polyurethane foams, are inherently flammable and lead to melting and the spread of burning polymer particles or droplets. In the case of many "conventional" foams, such characteristics lead to a sustained combustion due to progressive smoldering even after the actual flames have been extinguished.

It is known that cellular materials manufactured from flammable polymers are more flammable than solid polymeric materials because the insulating effect of the cellular structure allows for a rapid build-up of heat at the heating surface with a consequential high rate of pyrolysis.

U.S. patent application Ser. No. 480,416, filed Feb. 15, 1990 of Mc Cullough et al, which is herein incorporated by reference, discloses fire resistant monocomponent fibers, films and foams. There is further disclosed the precursor materials which can be used in the present invention.

U.S. Pat. No. 3,639,953, to Kimura et al discloses a bicomponent fiber wherein pitch and a polymeric material are concurrently spun and bonded together longitudinally, and then both components are oxidized and carbonized.

U.S. Pat. No. 3,811,997, to E. L. Yaun discloses smoke and flame resistant structural articles for use in aircraft. The articles can be of a laminate or a honeycomb construction. The articles are provided with a thin film of polyimide or polyamide to retard combustion of the underlying laminate and reduce smoke effusion from any burning that does occur.

U.S. Pat. No. 4,832,881, to Arnold, Jr. et al discloses a low density microcellular carbon foam for use as catalysts, adsorbents and electrodes. These foams, which are prepared from oxidized polyacrylonitrile, have a density greater than 1.39 g/cc.

U.S. Pat. No. 4,255,483, to N. R. Byrd et al discloses an acoustic firewall for use in environments such as an aircraft engine nacelle. The firewall includes a graphite fiber or glass cloth embedded in a silica-containing polyimide resin. The presence of the silica is described as being necessary to provide the polyimide resin and the firewall with the desired stability in the presence of a fire and with low thermal conductivity.

U.S. Pat. No. 4,837,076, to Mc Cullough et al relates to the preparation of nonlinear carbonaceous fibers. U.S. Pat. No. 4,879,168, to Mc Cullough et al relates to thermal insulating and sound absorbing structures employing nonlinear carbonaceous fibers and to classes of such fibers having different electroconductivity which can be used in the present invention. Each of these patents are incorporated herein by reference.

Representative of the state of the art relating to carbonaceous foams is U.S. Pat. No. 4,832,870, to Sylwester et al which discloses a carbon foam that is filled with polymeric resin and which contains reinforcing carbon or glass fibers.

It is understood that the term "fire resistant" as used herein relates to any one of the characteristics of flame arresting, flame retarding, fire shielding and fire barrier.

An article is considered to be flame retarding to the extent that once an igniting flame has ceased to contact unburned parts of the textile structure, the article has the inherent ability to resist further propagation of the flame along its unburned portion, thereby stopping the internal burning process. Recognized tests to determine whether a textile article is flame retarding, inter alia, are the American Association of Textile Chemists and Colorists Test Method 34-1966 and the National Bureau of Standards Test described in DOC FF 3-71.

An article is considered to be "flame arresting," if it has the ability to block flames from contact with an unburned part of a flammable substance for at least five minutes.

An article is considered to be "fire shielding," if it is capable of deflecting flames and the radiation therefrom in a similar manner as aluminum coated protective garments which are known in the art.

Fire barriers have the capability of being non-flammable, flame retarding and providing thermal insulation characteristics.

The term "carbonaceous" used herein relates to polymeric substances whose carbon content have been irreversibly increased as a result of a chemical reaction such as a heat treatment, as disclosed in U.S. Pat. No. 4,837,076.

The term "non-graphitic" as used herein relates to those carbonaceous materials, which are substantially free of oriented carbon or graphite microcrystals of the three dimensional order that typically have an elemental carbon content of less than 98% and as defined in U.S. Pat. No. 4,005,183, which is herein incorporated by reference.

The term "flash heat treatment" as utilized herein refers to a heat treatment of the polymeric material for a short period of time at elevated temperatures by control of either the term of stay polymeric material in a heating environment or the state of control of the heat source.

SUMMARY OF THE INVENTION

In accordance with the present invention, there are provided multicomponent polymeric fibers, films and foams having on at least one surface a component comprising a fire resistant non-graphitic carbonaceous material. Another component of the fibers, films and foams comprises a non-carbonaceous polymeric material.

In accordance with one embodiment of the invention, the carbonaceous material is extruded onto a surface of a non-carbonaceous polymeric material.

In accordance with another embodiment of invention, the carbonaceous material is coextruded with non-carbonaceous polymeric material. In the case of fibers, the components can be extruded to be side-by-side longitudinally for forming a sheath-core arrangement.

In accordance with a third embodiment of the invention, a polymeric base fiber, film or foam is selectively oxidized and/or heat treated on a surface to form a fire resistant component which is integral with the base fiber, film or foam.

The amount of carbonaceous materials present should be sufficient to provide a desired fire resistance to the particular fiber, film or foam.

The non-graphitic carbonaceous polymeric material may be characterized by having a Limiting Oxygen Index (LOI) value greater than 40 as determined by test method ASTM D2863-77, a char formation greater than 65% and a thermal conductivity of less than 1 BTU ft/Hr ft$^2$ °F.

The carbonaceous polymeric material may be further characterized by a specific resistivity of greater than 10 ohm-cm, preferably about $10^2$ to $10^8$ ohm-cm.

The measurement of char formation as discussed herein is made using a standard thermogravimetric analysis apparatus adapted so as to perform the analysis in a nitrogen atmosphere. The apparatus is described in Encyclopedia of Polymer Science, Vol. 14, p. 21, John Wiley & Son, 1971, which is incorporated herein by reference.

The measurement is performed by loading a sample onto a sample pan of the thermogravimetric analysis apparatus. The sample is then heated in a nitrogen atmosphere at a rate of 10° C./min from ambient temperature to 900° C. The weight is recorded by the thermogravimetric apparatus as a function of remaining sample weight versus temperature. The percent of original weight remaining at 800° C. is taken as the char percentage.

The percent char formation and thermal conductivities of different materials are as follows:

| | % Char | Conductivity ft/Hr ft$^2$ °F. |
|---|---|---|
| Carbonaceous particles (18.6% N$_2$) of invention | >65 | 0.1 |
| Carbonaceous particles (16.0% N$_2$) of invention | >65 | 0.2 |
| KEVLAR | 60 | <1 |
| KODEL 410 polyester | 10 | <1 |
| Polyacrylonitrile | 60 | <1 |
| Oxidized polyacrylonitrile | 60 | <1 |
| THORNEL 300* carbon fiber | >95 | 4.84 |
| Cotton | >30 | <1 |
| Rayon | <50 | <1 |
| Polycarbonate | 22 | <1 |
| Polyethylene terephthalate | 10 | <1 |
| Carbon particles | >90 | 2.5 |
| THORNEL Graphite fiber P758** | >95 | 106.48 |

*1K/3K/6K/15K Carbon yarn of Amoco Corp., Danbury CT.
**2K/4K Carbon yarn derived from pitch of Amoco Corp., Danbury CT.

Other objects and advantages, including obvious modifications and adaptations, will be apparent to those of ordinary skill in the art from the following drawings and further description of the preferred embodiments.

BRIEF DESCRIPTION OF THE DRAWINGS

FIG. 1A is a perspective view of a carbonaceous fiber of the invention,

FIG. 1B is a front view of another fiber of the invention;

FIG. 2 is a perspective view of a film of the invention, and

FIG. 3 is a perspective view of a foam of the invention.

DESCRIPTION OF THE PREFERRED EMBODIMENTS

In accordance with one embodiment of the invention, a multicomponent polymeric fiber, film or foam is prepared with one component which provides fire resistance. The fire resistant component comprises a non-graphitic carbonaceous polymeric material having an LOI value greater than 40, a thermal conductivity less than 1 BTU ft/Hr ft$^2$ °F. and a char formation greater than about 65%. Another component of the fiber, film or foam comprises non-carbonaceous polymeric material.

As shown in FIG. 1A, a fiber 10 is provided with a non-graphitic carbonaceous sheath 11 and a non-carbonaceous flexible and resilient core 12. The fiber 10 can be linear or non-linear. The fiber 10 can be formed by conjugate spinning when the fiber 10 is multicomponent and the carbonaceous component and non-carbonaceous component are in a side-by-side arrangement or in a sheath-core arrangement. In conjugate spinning, a spinning dope comprising particles of carbonaceous materials and a suitable thermoplastic or thermosetting resin is prepared. Preferably, a thermoplastic having a low melting point such as a polyester is utilized. About 10 to 50% by weight of polyester is generally suitable for preparing the carbonaceous composition for the spinning process.

Conjugate spinning of carbonaceous composition and non-carbonaceous polymer can be carried out according to conventional conjugate spinning processes. No particular attention is necessary in the spinneret. The conjugate spinning of both the components, for example, the melt conjugate spinning of a carbonaceous composition and polyacrylonitrile can be carried out at a temperature of 225° to 375° C. by means of a spinneret provided with orifices having a diameter of 0.1 to 0.4 mm.

The structure bonding of the above-described components may be either a side-by-side relation or a sheath-core relation.

As seen in FIG. 1B, a fiber 15 may be prepared wherein there are zones 16, 17, 18 of different degrees of heat treatment and/or electrical conductivities. This type of fiber can be prepared, for example, with a precursor fiber that has been completely or partially oxidized or stabilized in its cross section and then flash heat treated in an inert atmosphere to convert the surface of the fiber into the desired carbonaceous material. The fiber 15 can then have a outer carbonaceous surface 16 which is integral with a less heat treated zone 17 and integral with a core 18. The core 18 can comprise the original fiber or a stabilized fiber material.

When heat treatment is in a relaxed and unstressed condition, the multicomponent fiber has improved elongability in the linear or non-linear form over those multicomponent fibers heat treated while under stress or tension.

For most purposes, a fire resistant surface of 0.40 to 0.60 microns for fibers having a fiber diameter of about 4 to 20 microns is sufficient.

The fire resistant fibers of the present invention can be blended with other synthetic or natural fibers. Examples of such fibers include other carbon fibers, cotton, wool, polyester, polyolefin, nylon, rayon, glass fibers, fibers of silica, silica alumina, potassium titanate, silicone carbide, silicon nitride, boron nitride, boron, acrylic fibers, tetrafluoroethylene fibers, polyamide fibers, vinyl fibers, protein fibers, ceramic fibers such as aluminum silicate, and oxide fibers such as boron oxide.

As seen in FIG. 2, a multicomponent film 20 can be provided which comprises carbonaceous outer surfaces 21A, 21B and a non-carbonaceous inner core 22. Similar to the multicomponent fibers of the invention, the precursor film can be selectively stabilized or oxidized. That is, the film can be stabilized throughout as disclosed in application Ser. No. 480,416 or stabilized only on one or more of its surfaces by a flash heat treatment depending upon its thickness.

Alternatively, the multicomponent film can be prepared by the coextrusion of a base polymeric material together with a carbonaceous composition according to conventional techniques. For example, a combination of carbonaceous particles in a matrix of a low melting thermoplastic or thermosetting resin, preferably a polyester, can be coextruded with a polyacrylonitrile polymer or copolymer into a multicomponent sheet or film.

The carbonaceous layer can comprise a layer with a graduating degree of electrical conductivity or the same degree of electrical conductivity depending upon the method of preparation.

As shown in FIG. 3, a multicomponent foam 30 can be provided with at least one surface 31 comprising fire resistant carbonaceous material. The base foam component 32 can be a stabilized, partially stabilized or non-stabilized polymeric foam depending upon the preparation. According to one method of preparation, the base polymeric material 32 can be completely stabilized or stabilized on at least one surface. The partial stabilization can be affected by a flash heat treatment. Complete stabilization can be performed according to the process disclosed in application Ser. No. 480,416. The stabilized surface can then undergo a suitable heat treatment in an inert atmosphere so as to have a desired electrical conductivity.

The carbonaceous layer or surface layer can comprise throughout the layer the same degree of electrical conductivity or a graduating degree of electrical conductivity depending upon its method of preparation. Flash heat treatment can provide a graduating degree of electrical conductivity.

The precursor foams of the invention can be prepared by conventional means such as extrusion, impregnation, autoclave, solution expansion or a lost foam casting technique.

The blowing agent for preparing the precursor foam materials used in this invention include those blowing agents which vaporize or otherwise generate a gas under the conditions encountered in the foaming reaction. Materials which boil under such conditions include low boiling halogenated hydrocarbons such as chlorotrifluoromethane, dichlorodifluoromethane, trichlorofluoromethane, HCFC-141B ($CH_3CCl_2F$), HCFC-142B ($CH_3CClF_2$), HCFC-123 ($CF_3CHCl_2$), HCFC-124 ($CF_3CHClF$), HFC-134A ($CF_3CH_2F$), methylene chloride, chloroform, trichloromethane and the like. Suitable materials which react to form a gas under the conditions encountered in a foaming reaction can also be used. Preferred are $CO_2$, $N_2$, halogenated hydrocarbons and mixtures thereof.

Polymeric precursor materials which are advantageously utilized in preparing the carbonaceous materials of the invention are selected from one or more of the following: acrylonitrile homopolymers, acrylonitrile copolymers and acrylonitrile terpolymers. The copolymers preferably contain at least about 85 mole percent of acrylonitrile units and up to 15 mole percent of one or more monovinyl units of styrene, methylacrylate, methyl methacrylate, vinyl chloride, vinylidene chloride, vinyl pyridine and the like, copolymerized therewith. The acrylic materials can also comprise terpolymers wherein the acrylonitrile units are at least about 85 mole percent.

The precursor polymeric materials can be prepared from well known materials such as pitch (petroleum or coal tar), polyacetylene, acrylonitrile based materials, e.g., a polyacrylonitrile copolymer such as GRAFIL-01

(trademarks of E. I. du Pont de Nemours & Co.), polyphenylene, polyvinylidene chloride, polyaromatic amides (KEVLAR a trademark of E. I. du Pont de Nemours & Co.), polybenzimide, resin, SARAN (trademark of The Dow Chemical Company), and the like.

The carbonaceous materials derived from polyacrylonitrile based materials which can be utilized in the invention have a nitrogen content of about 5 to 35% and are generally classified into three groups.

In a first group, the carbonaceous material has a carbon content of greater than 65% but less than 85%. These materials are electrically nonconductive, and do not possess any electrostatic dissipating characteristics, i.e., they are not able to dissipate an electrostatic charge.

The term electrically nonconductive as utilized in the present invention relates to an electrical resistivity of greater than $10^7$ ohms-cm.

When the polymeric material is a stabilized and heat set polyacrylonitrile, it has been found that a nitrogen content of about 18% or higher results in an electrically non-conductive material.

In a second group, the carbonaceous materials are classified as being partially electrically conductive (i.e., having a low conductivity) and having a carbon content of greater than 65% but less than 85%. The percent nitrogen content of such material is generally 16 to 20%. Low conductivity means that the electrical resistivity is greater than $10^{-1}$ ohms-cm to about $10^7$ ohms-cm.

In a third group the carbonaceous material has a carbon content of at least 85 percent but less than 92% and a nitrogen content of at least 5%. This material is characterized as having a high electroconductivity. That is, the material when in fiber form has an electrical resistivity of less than $10^{-1}$ ohm-cm.

Exemplary embodiments of the present invention are those set forth in the following examples.

EXAMPLE 1

In the following example, a foam was prepared in which a polymer was heat plastified in an extruder substantially in the manner of U.S. Pat. No. 2,669,751, and a volatile fluid blowing agent injected into the heat plastified gel was passed into a mixer, the mixer being a rotary mixer wherein a studded rotor is enclosed within a housing which has a studded internal surface that intermeshes within the studs on the rotor. The heat plastified gel from the extruder was fed into the end of the mixer and discharged from the remaining end, the flow being in a generally axial direction. From the mixer, the gel was passed through coolers, such as described in U.S. Pat. No. 2,669,751, and from the coolers to a die which extruded a generally rectangular board.

A. A heat plastified polyacrylontrile stream was fed to the extruder at the rate of 541 parts by weight per hour. The blowing agent consisted of a 1:1 by weight mixture of methyl chloride and dichlorodifluoromethane which was injected into the heat plastified polymer prior to its entry to the mixer. The intermeshing studs of the mixer have a relative velocity of 100 ft/min (1829 m/hr). A total feed of $10.3 \times 10^{-4}$ moles of blowing agent per gram of polymer was employed. Indigo, in an amount of 0.06 part per 100 parts of polymer, was added as a nucleator. A stable rectangular board was extruded at a temperature of 121.5° C. having a cross-sectional dimension of $2.25 \times 24$ in ($5.7 \times 61$ cm) and an average cell diameter of 0.4 millimeter.

B. The foam from Part A was stabilized by heating in a preheated oven at 175° C. for 20 minutes. The foam was conveyed into an oven having an argon atmosphere and overhead heaters. The heaters provided radiant heat of 525° C. to 550° C. to the top surface of the foam for 2 minutes. A carbonaceous top layer which was black in color appeared and the foam was removed. The carbonaceous component had a thermal conductivity of about 0.75 BTU ft/Hr ft$^2$ °F.

EXAMPLE 2

A precursor foam material was prepared according to the autoclave method as follows:

In an autoclave having an inner volume of 5 liters, 2 kg. of acrylonitrile resin pellets and 1 kg of trichloromonofluoromethane were heated at 45° C. Foamable resin pellets were obtained containing 0.15 g mol/(100 g of resin) of the foaming agent. The pellets were foamed by heating with steam at a pressure of 0.3 kg/cm$^2$.

The resulting foam was stabilized pursuant to the procedure described in said application Ser. No. 480,416. The stabilized foam was placed in an oven having overhead heaters under an argon atmosphere. The foam was flash heat treated for 1 minute at 550° C. whereby the top surface layer turned black. The black layer had a thermal conductivity of 0.8 BTU ft/Hr ft$^2$ °F.

EXAMPLE 3

Following the procedure set forth in U.S. Pat. No. Re. 27,794, 100 grams of polyvinyl chloride powder were heated in nitrogen gas at a rate of 10° C./minute up to a temperature of 200±5° C., which temperature was maintained for one hour. The molten precursor polymer was then cast into a film which was then heated in air at a rate of 5° C./minutes to a temperature of 175° C.

The stabilized film was then placed in an oven with an argon atmosphere and overhead heaters. The stabilized film was flash heat treated for 1 minute at a temperature of 525° C. until a black top surface coat appeared. The film had a top layer which had a specific resistance of $10^4$ ohms-cm.

EXAMPLE 4

A spinneret for producing side-by-side composite fibers was used in which one component is entered into the other component in the form of a neck so that both components do not separate. Polyacrylontrile was used as one component. A composition comprising 85% carbonaceous particles and 15% polyester (Kodel 410 of Eastman Kodak) was used as the other component. These spinning materials were heated to make flowable and conjugate spun in a conjugate ratio of 2/1 at 260° C., through nozzles having a diameter of 0.2 mm for providing sheath-core composite fibers into air at room temperature. The carbonaceous material formed the sheath component. The spun fibers were taken up on a bobbin spaced 6 m just under the nozzles at a takeup velocity of 500 m/min.

To form a non-linear fiber the spun fibers may be processed on the apparatus disclosed in either of copending application Ser. Nos. 340,098 and 340,099, of F. P. Mc Cullough, which are herein incorporated by reference. The fibers formed thereby are sinusoidal is configuration and have a reversible deflection greater about 1.2:1.

What is claimed is:

1. A multicomponent polymeric fiber, film or foam having at least one component comprising fire resistant carbonaceous material and another component comprising non-carbonaceous material.

2. The multicomponent polymeric fiber, film or foam wherein said carbonaceous material has a limiting oxygen index value of greater than 40, a char formation of greater than 65% and a thermal conductivity of less than 1 BTU ft/Hr ft$^2$ °F.

3. The multicomponent polymeric fiber, film or foam of claim 1 comprising a fiber having a carbonaceous component and a non-carbonaceous component eccentrically disposed toward each other in distinct zones extending throughout the length of the fiber with adjoining surfaces in intimate adhering contact.

4. The multicomponent polymeric fiber, film or foam of claim 1, wherein said carbonaceous material is derived from an oxidation stabilized acrylic resin selected from the group consisting of the homopolymers, copolymers and terpolymers of acrylonitrile.

5. The multicomponent polymeric fiber, film or foam of claim 1 wherein said carbonaceous material has a nitrogen content of from 5 to 35 percent.

6. The multicomponent fibers, film or foam of claim 1 comprising nonlinear, resilient, shape reforming and elongatable fibers, having a sinusoidal configuration, and a reversible deflection ratio of greater than 1.2:1.

7. The multicomponent fibers, film or foam of claim 1 wherein at least one component comprises stabilized acrylic material selected from acrylonitrile homopolymers, acrylonitrile copolymers and acrylonitrile terpolymers.

8. The multicomponent fiber, film or foam of claim 1, wherein the carbonaceous fiber, film or foam are derived from a stabilized polymeric precursor material selected from polyacrylonitrile, polybenzimide, polyvinyl chloride and polyvinylidene chloride.

9. A multicomponent polymeric foam comprising a non-carbonaceous polymeric foam component and a non-graphitic carbonaceous foam component having an LOI value of greater than 40, a char formation of greater than about 65 percent, and a thermal conductivity of less than 1 BTU ft/Hr ft$^2$ °F.

10. A multicomponent polymeric foam comprising at least one non-carbonaceous stabilized polymeric foam component and at least one fire resistant non-graphitic carbonaceous foam component on the surface, said carbonaceous foam component having an LOI value greater than 40, a char formation greater than 65% and a thermal conductivity less than 1 BTU ft/Hr ft$^2$ °F.

11. The multicomponent foam of claim 10, wherein said carbonaceous foam component is electrically conductive.

12. The multicomponent foam of claim 10 wherein said carbonaceous foam component is electrically nonconductive.

13. The multicomponent foam of claim 10 wherein said carbonaceous foam component is derived from an oxidation stabilized acrylic resin selected from the group consisting of the homopolymers, copolymers and terpolymers of acrylonitrile.

14. The multicomponent foam of claim 10, wherein said non-carbonaceous foam component is derived from an oxidation stabilized acrylic resin selected from the group consisting of the homopolymers, copolymers and terpolymers of acrylonitrile.

15. The multicomponent foam of claim 10 wherein the carbonaceous component and the non-carbonaceous component are eccentrically disposed toward each other in distinct zones extending throughout the length of the foam with adjoining surfaces in intimate adhering contact.

16. A multicomponent polymeric film comprising at least one non-carbonaceous component and at least one carbonaceous component, said carbonaceous component having an LOI value greater than 40, a char formation greater than 65% and a thermal conductivity less than 1 BTU ft/Hr ft$^2$ °F.

17. The multicomponent film of claim 16 wherein said non-carbonaceous component is stabilized.

* * * * *